US012465261B2

(12) United States Patent
Govari et al.

(10) Patent No.: US 12,465,261 B2
(45) Date of Patent: Nov. 11, 2025

(54) FILTERING POWER LINE NOISES FROM ANALOG ELECTROPHYSIOLOGICAL SIGNALS IN REAL-TIME

(71) Applicant: BIOSENSE WEBSTER (ISRAEL) LTD., Yokneam (IL)

(72) Inventors: Assaf Govari, Haifa (IL); Shmuel Auerbach, Kerem Maharal (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 233 days.

(21) Appl. No.: 18/105,266

(22) Filed: Feb. 3, 2023

(65) Prior Publication Data
US 2023/0255536 A1 Aug. 17, 2023

Related U.S. Application Data

(60) Provisional application No. 63/309,784, filed on Feb. 14, 2022.

(51) Int. Cl.
*H03D 1/04* (2006.01)
*A61B 5/00* (2006.01)
*A61B 5/30* (2021.01)

(52) U.S. Cl.
CPC .............. *A61B 5/30* (2021.01); *A61B 5/7257* (2013.01); *A61B 5/7203* (2013.01)

(58) Field of Classification Search
CPC ....... A61B 5/30; A61B 5/7257; A61B 5/7203; A61B 5/308; A61B 5/318
USPC ........................................................ 375/346
See application file for complete search history.

(56) References Cited

U.S. PATENT DOCUMENTS

| 7,894,885 B2 | 2/2011 | Bartal |
| 2005/0277826 A1 | 12/2005 | Dunseath |
| 2009/0099473 A1 | 4/2009 | Dunseath |
| 2011/0066052 A1* | 3/2011 | Mascarenhas ......... A61B 5/316 600/509 |
| 2012/0323132 A1 | 12/2012 | Warner |
| 2015/0005585 A1* | 1/2015 | Xu ......................... A61B 5/305 600/300 |

(Continued)

FOREIGN PATENT DOCUMENTS

| EP | 1987767 A1 | 11/2008 |
| WO | WO2017049184 A1 | 3/2017 |

OTHER PUBLICATIONS

European Search Report for corresponding EPA No. 23156325.5 dated Sep. 25, 2023.

(Continued)

*Primary Examiner* — Helene E Tayong

(57) ABSTRACT

A power line interference (PLI) suppression method includes receiving an input analog signal superimposed with PLI, and digitally estimating one or more harmonics of the PLI in real-time. Responsively to the one or more digitally estimated harmonics, one or more analog harmonic waveforms are outputted, that match the respective one or more harmonics of the PLI. The input analog signal and the one or more analog harmonic waveforms are received, and the superimposed PLI in the input analog signal is suppressed using the one or more analog harmonic waveforms. An analog output signal is outputted, that corresponds to the input analog signal having the suppressed PLI.

19 Claims, 4 Drawing Sheets

(56) References Cited

U.S. PATENT DOCUMENTS

2019/0261927 A1    8/2019   Matthiesen
2020/0297281 A1    9/2020   Basu

OTHER PUBLICATIONS

Degen Thomas Werner Werner et al: "Portable devices for mobile health monitoring", Jan. 1, 2011 (Jan. 1, 2011), pp. 1-168, XP093053531, DOI: 10.3929/ethz-a-6560370 Retrieved from the Internet: URL:https://www.research-collection.ethz.ch/bitstream/handle/20.500.11850/152806/eth-2934-02.pdf?sequence=2&isAllowed=y [retrieved on Jun. 12, 2023].

* cited by examiner

FILTERING POWER LINE NOISES FROM ANALOG ELECTROPHYSIOLOGICAL SIGNALS IN REAL-TIME

FIELD OF THE DISCLOSURE

The present disclosure relates generally to processing of electrophysiological signals, and specifically to removal of electrical power line noises from analog electrograms and electrocardiograms.

BACKGROUND

A number of techniques to remove power line interference (PLI) from electrocardiograms (ECG) were proposed in the patent literature. For example, U.S. Pat. No. 7,894,885 describes a method for monitoring an electrocardiogram (ECG) signal of a subject, the method including digitally sampling an average signal from at least a first ECG electrode, determining an average interference frequency, and digitally sampling and buffering a raw ECG signal from at least a second ECG electrode. The method further includes: filtering the raw ECG signal to generate a residual signal; calculating, based on the residual signal, a first amplitude and a first phase shift of a primary interference signal at the average interference frequency and a second amplitude and a second phase shift of one or more harmonic interference signals at respective multiples of the average interference frequency; and digitally subtracting the primary interference signal and the one or more harmonic interference signals from the raw ECG signal so as to generate and output a clean ECG signal.

The present disclosure will be more fully understood from the following detailed description of the examples thereof, taken together with the drawings in which:

DETAILED DESCRIPTION OF EXAMPLES

Overview

Figure 1:
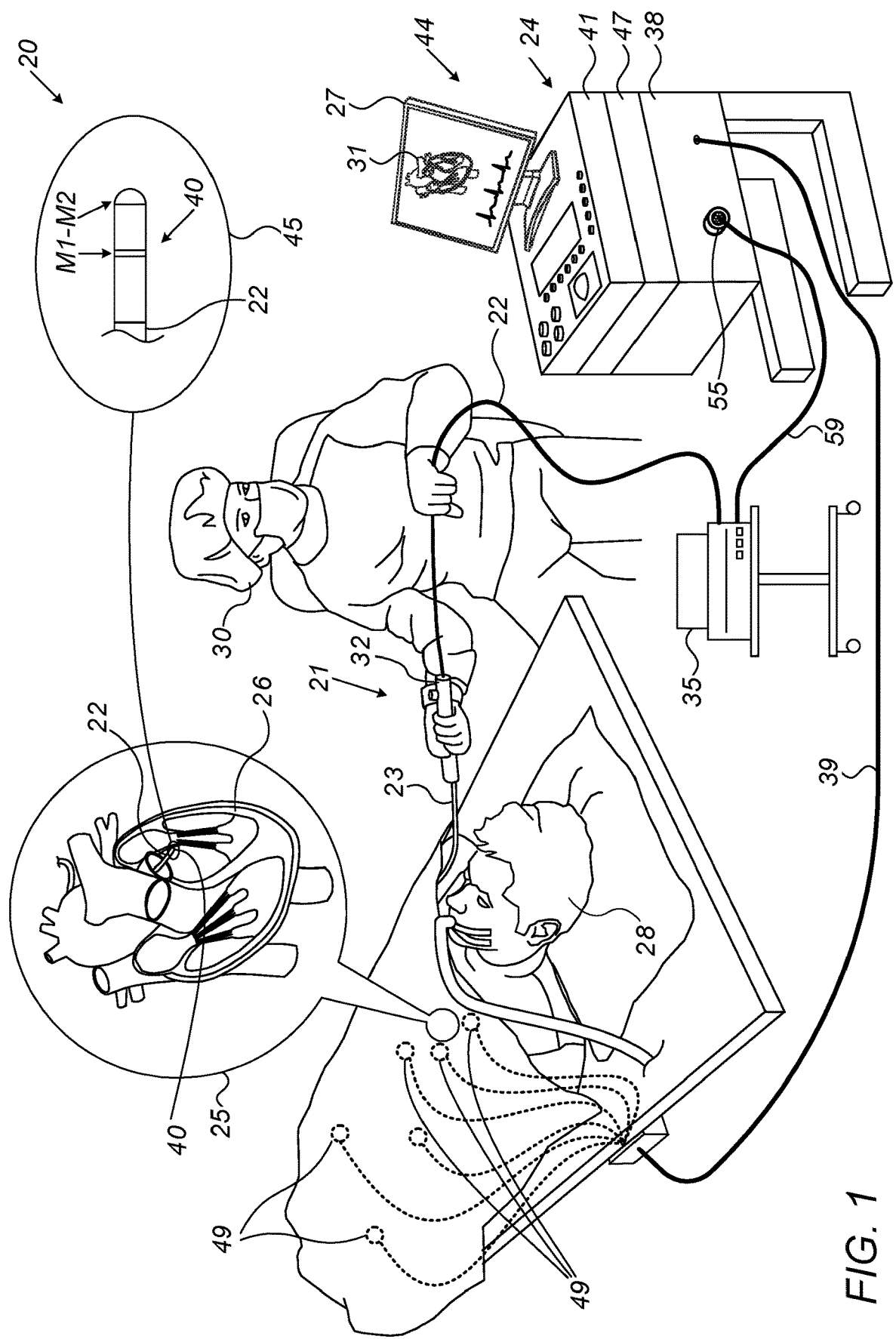
FIG. 1 is a schematic, pictorial illustration of a catheter-based electrophysiological (EP) sensing, signal-analysis, and ablation system, with a standalone recorder, the recorder being interfaced via a power line interference (PLI) hybrid filter, according to an example of the present disclosure.

Cardiac diagnostics may involve acquisition of electrophysiological (EP) data, such as body surface electrograms and intra-cardiac electrograms, both referred to herein as ECG signals, for example to identify cardiac arrhythmogenic tissue.

Typically, during and EP procedure, ECG signals are acquired and displayed in real-time on a multi-channel ECG recorder for inspection by the medical staff. Pacing timing is based on the real-time signals that are acquired by the recorder. The recorder can further display intra-cardiac ECG signals acquired by one or more electrodes of a catheter, such as an EP mapping catheter.

Typically, the timing of the pacing signal is synchronized with the ECG signals recorded and is initiated at a define delay relative to a T-wave to avoid initiating ventricular tachycardia and fibrillation. To facilitate accurate pacing, therefore, a pacing instrument has to accurately detect the T-wave in real-time.

One of the challenges of identifying the T-wave is Power line interference (PLI). The T-wave is particularly sensitive to PLI and is often distorted despite proper grounding, shielding, and amplifier design. Digital methods for removing PLI are known. However, PLI removal in the digital domain causes time delay, which may render the desired synchronous pacing inaccurate (e.g., in small delay time relative to T-wave).

Therefore, a particularly challenging task that requires a solution is removing PLI in real-time. Removal of PLI in real-time may also be useful generally for inspecting the captured ECG signals.

Some examples of the present disclosure that are described hereinafter provide techniques to remove at least a significant part of PLI from the analog EP signal (e.g., before the EP signal is digitized) in real-time. Optionally, this may assist in identifying the T-wave may in real-time. The disclosed filter is referred to as "hybrid" because the PLI estimation is performed digitally, but its cancellation (e.g., subtraction from the original EP signal) is analog.

The hybrid technique samples the ECG signal using circuitry designed to detect the PLI fundamental harmonic (e.g., 50 Hz) as well as its higher harmonics. In one example, a microprocessor is tuned to digitally extract any PLI component, e.g., 50 Hz or 60 Hz component and its higher harmonics from the incoming signal.

In this example, the noise signal is estimated between consecutive PLI cycles (e.g., every 20 mSec for 50 Hz PLI). The circuitry converts the digitally generated (predicted) noise signal to an analog signal and adds it from the original analog ECG with a predicted phase shift that provides cancelling the PLI from the analog signal, e.g., 180° phase shift plus a predicted delay associated with the digital processing to detect the PLI.

In some example embodiments, this PLI removal technique uses feedback for tuning the phase shift to improve PLI suppression. Namely, the disclosed feedback technique uses circuitry with a feedback loop, to improve the PLI suppression over time. In this solution, the first few cardiac cycles may still be noisy, but subsequently the processing circuitry achieves sufficient suppression in real-time.

In another example, a PLI removal technique uses a predictive method to reduce the magnitude of PLI from ECG in real-time with practically zero delay time or time jitter (e.g., both <0.1 mSec). The predictive technique assumes that changes in the parameters of the PLI occur slowly compared with a duration of a cardiac cycle. Therefore, one or more relatively recent cycles can be used for estimating parameters of the PLI, e.g. energy of the PLI, phase and/or frequency. The required phase shift of the PLI interference removal signal generated by the circuitry is predicted (e.g., phase corrected by calibration, as described below). The phase-matched removal signal is added to the real-time analog ECG signal to subtract the PLI and outputted to the aforementioned recording instrument with the reduced PLI.

Some examples provide a PLI filter comprising (a) a PLI harmonics estimator, which is configured to (i) receive an input raw analog ECG signal superimposed with PLI and estimate in real-time one or more harmonics of the PLI, and (ii) output one or more harmonic waveforms matching the respective one or more harmonics of the PLI responsively to the estimation, and (b) a PLI canceler (such as a differential amplifier, or a signal combiner) which is configured to (i) receive the input analog ECG signal as one input, and receive one or more harmonic waveforms as another input, so as to suppress (e.g., remove) the superimposed PLI from the input signal, and (ii) output a respective analog ECG signal, being the input signal removed from the PLI.

Even if the 50/60 Hz and its harmonics noise is not completely eliminated by any of the above examples, the level of PLI suppression achieved in real-time may be significant.

System Description

FIG. 1 is a schematic, pictorial illustration of a catheter-based electrophysiological (EP) sensing, signal-analysis, and ablation system 20, with a standalone recorder 35. Recorder 35 is typically used by the physician to view the analog ECG signals (both intracardiac and body surface). The recorder 35 is being interfaced via a hybrid power line interference (PLI) filter 55, according to an example of the present disclosure. System 20 may, for example, include a patient interface unit (PIU) 24, e.g., a CARTO® 3 system, produced by Biosense-Webster. ECG leads connected to PIU 24 are sampled for further processing and are also directed to recorder 35 for real-time display of the raw ECG signal. Elements such as electrical power cables, sockets and inlets are omitted from FIG. 1 for clarity.

As seen, system 20 includes a catheter 21, having a shaft 22 that is navigated by a physician 30 into a heart 26 of a patient 28. In the pictured example, physician 30 inserts shaft 22 through a sheath 23, while manipulating shaft 22 using a manipulator 32 near the proximal end of the catheter.

As shown in insets 25 and 45, a distal end of shaft 22 of catheter 21 is fitted electrodes that may be used for pacing, e.g., with a bipolar pacing assembly 40 comprising electrode pair M1-M2. The proximal end of catheter 21 is connected to a PIU 24 and to recorder 35, e.g., via PIU 24.

PIU 24 receives from body surface ECG patches 49 and/or from electrodes mounted at a distal end of catheter 21, e.g., M1, M2, ECG waveforms superimposed with PLI. Typically, patches 49 are attached to the skin around the chest and legs of patient 28. PIU 24 is connected to patches 49 by wires running through a cable 39 to receive signals from ECG patches 49. PIU 24 is connected to catheter 21 by wires running through a cable 22 to receive signals from electrodes at the distal end of catheter 21. Recorder 35 may receive PLI superimposed signal from electrodes of a catheter such as an EP mapping catheter, e.g., catheter 21 optionally also used for mapping or other dedicated mapping catheters (not shown).

Recorder 35 is used to generate a pacing signal in synchronization with recorded ECG signals. Alternatively, a standalone pacer in communication with recorder 35 may generate the pacing signals. As an example, identification of the T-wave provides avoiding pacing during the T-wave. The T-wave is typically sensitive to PLI and proper identification may be improved by removing at least some of the PLI from the ECG signal displayed on recorder 35. In some example embodiments, hybrid filter 55 is configured to remove at least a portion of PLI without imposing a delay in the ECG signal provided to recorder 35.

According to some example embodiments, a hybrid PLI filter 55 is integrated on line 59 and is configured to reduce PLI of the raw ECG prior to directing the analog signal to input of recorder 35.

Hybrid PLI filter 55 accommodates at least one type of the disclosed PLI removal circuitries (shown in FIGS. 2 and 3) that remove the PLI from analog ECG signals before the ECG signals are inputted into recorder 35.

A technique to remove coherent signals, including PLI, from the signal inside console 24 is described in U.S. Pat. No. 7,894,885, which is incorporated herein by reference.

One or more additional catheters (not seen) may be inserted into heart 26 to perform EP mapping and/or ablation. To this end ECG signals may be acquired from electrodes disposed on the one or more additional catheters (such signals also called in the disclosure, "intra-cardiac ECG signals"), and received by a PIU 24 and recorder 35. Such ECG signals may also be PLI filtered with hybrid filter 55. Additionally, non-mapping signals may be received from catheters (e.g., temperature and contact pressure readings).

PIU 24 may interface with processor 41 that may be for example a general-purpose computer, with the suitable front end and interface circuits 38 for receiving the various signals. Processor 41 uses the information contained in these signals to construct an electrophysiological map 31 and ECG traces 44, and to present these on a display 27. Display of ECG traces 44 on display 27 is typically at a delay with respect to the ECG traces shown on recorder 35.

During an EP mapping procedure, the locations of catheters can be tracked while they are inside heart 26 of the patient. Such tracking may be performed using the Active Current Location (ACL) system, made by Biosense-Webster, which is described in U.S. Pat. No. 8,456,182, whose disclosure is incorporated herein by reference.

Processor 41 may thus associate any given signal received from a catheter, such as ECGs, with the location at which the signal was acquired. Processor 41 uses information contained in these signals to construct an EP map, such as a local activation time (LAT) map, to present on a display. To perform ablation, electrodes of a mapping/ablation catheter (not shown) may be connected (e.g., switched) to a generator 47.

In various examples, the different elements of the disclosed hybrid PLI filter 55 may be implemented using suitable hardware, such as using one or more discrete components, one or more Application-Specific Integrated Circuits (ASICs) and/or one or more Field-Programmable Gate Arrays (FPGAs). Some of the functions of the disclosed hybrid PLI filter, e.g., some or all functions of their processor, may be implemented in one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory. In particular, hybrid PLI filter 55 run dedicated algorithm as disclosed herein, including in FIGS. 2 and 3, that enable filter 55 to perform the disclosed steps, as further described below.

PLI Removal from an Analog ECG Signal in Real-Time

Figure 2:
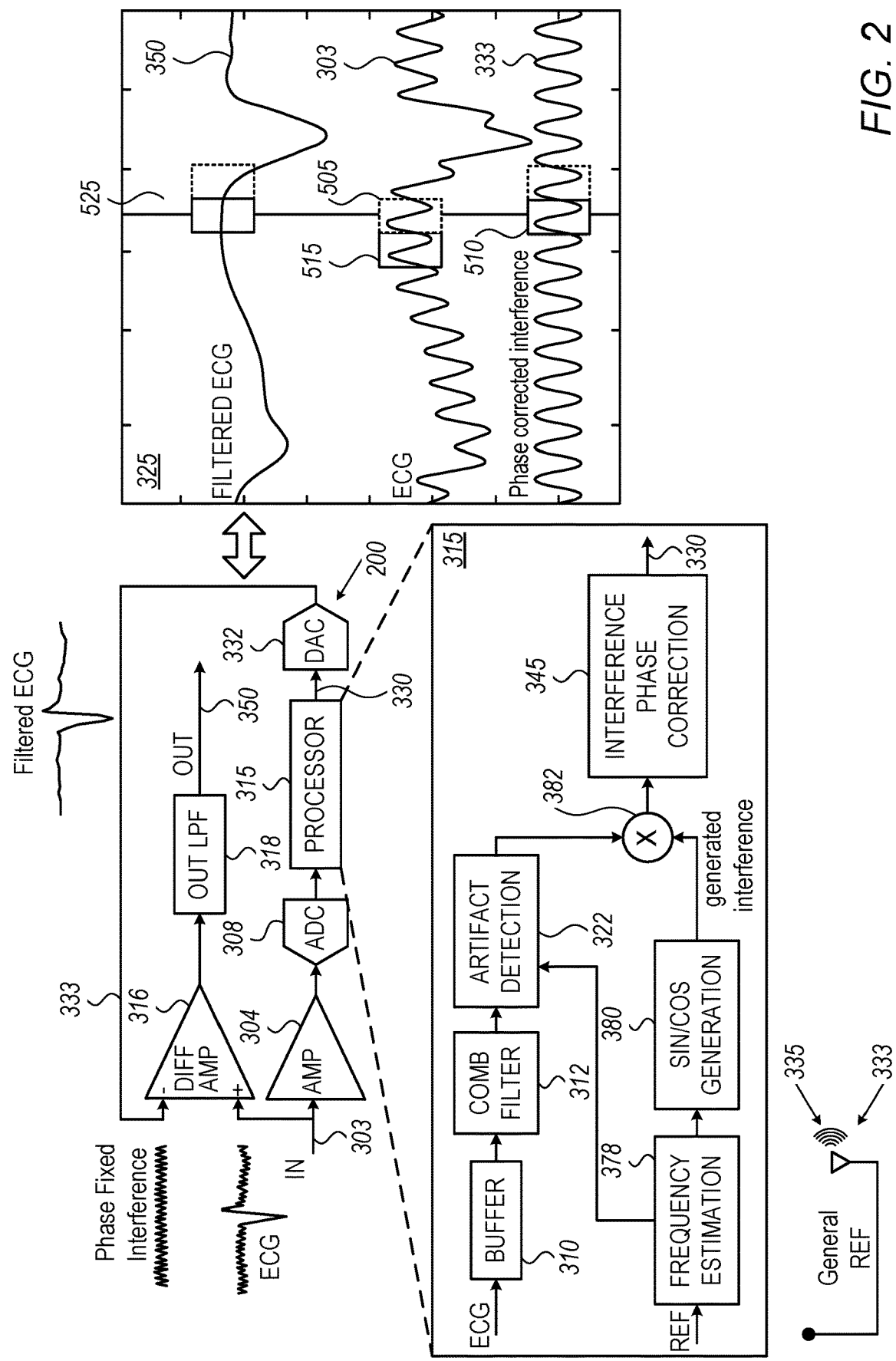
FIG. 2 is a schematic block diagram of a circuitry for PLI removal from an analog ECG signal in real-time, according to an example of the present disclosure.

FIG. 2 is a schematic block diagram of a circuitry 200 for PLI removal from an analog ECG signal 303 in real-time, according to an example of the present disclosure. Circuitry 200 is configured to sample the ECG signal and estimate the PLI signal with a time delay of 1-5 periods, e.g., one period of the PLI fundamental harmonic (e.g., a 20 mSec delay for 50 Hz signal) and to apply that estimation to remove the PLI in real-time. It is assumed that the PLI signal does not significantly change over this time period, e.g., over 100 mSec.

As seen, the input ECG signal (also seen in mid graph inset 325) is fed in parallel into an amplifier 304 and into the (+) differential amplifier 316, in a two-arm layout. ECG signal 303 is inherently superimposed with PLI, e.g., by a 50 Hz or 60 Hz sine wave and its harmonics (100 Hz, 150 Hz, and so on).

As further seen, the (−) differential amplifier 316 is fed by a phase-corrected interference signal 333 (also seen in lower graph inset 325). This signal is a linear combination of up to 10 harmonics of the PLI including the fundamental harmonic (e.g., combination of the amplitudes at 50 Hz-500 Hz). Difference amplitude amplifier 316 subtracts interference signal 333 from input ECG signal 303 to produce a PLI filtered signal 350 (after low-pass filtration by an LPF 318). PLI-cleaned signal 350 is also seen in top graph inset 325.

The above described PLI filtration is done with analog signals. To this end, an A/D and D/A circuits 308 and 332 enable a digital processor 315 to digitally characterize the PLI interference and responsively output a corrective digital signal 330 that is converted into analog signal 333. Elements 308, 315 and 332 are collectively called hereinafter "a predictive PLI harmonics estimator."

As noted above, PLI removal circuitry 200 uses a predictive method to remove PLI from ECG in real-time with negligible time delay. It is predicted that the PLI does not significantly change over the time period of computing the PLI with digital processor 315. The technique assumes that changes in the parameters of the PLI occur slowly. Therefore, one previous cycle is a good estimate of the noise. To achieve single cycle (e.g., 20 mSec) real-time performance, circuitry 200 acquires and digitizes one interference cycle (e.g., a 20 mSec at 50 Hz) before the one to be removed. This is seen in inset 325 as the signal sampled in box 505, in order to be estimated for a next cycle 515 and used for removing PLI harmonics from the ECG signal 510 during that cycle.

To digitally estimate and generate a digital corrective signal, processor 215 includes the following components:

1. A buffer 310 that stores a digital signal in the form of digital samples of at least one PLI cycle (e.g., 20 mSec sampled by a 1 kHz circuitry to generate 200 digital samples).
2. A comb filter 312 (FIR filter) that filters the digital signal to ensure that only ECG harmonics are calculated. The LPF (comb filter 312) filters out frequencies above 750 Hz.
3. An artifact detection module 322 (FFT algorithm) that calculates the amplitudes of 10 harmonics of the ~50 Hz (50 Hz-500 Hz) reference.
4. A frequency measurement module 378 that measures the actual frequency on the power line (e.g., 49.975 Hz)
5. A sin/cos signal waveform generator with the harmonics of the actual power line frequency measured above.
6. A multiplier that multiplies the harmonic waveform generated inference waveform at each frequency by the estimated amplitude.
7. A phase correction (e.g., fix) module 345, that, based on calibration described below, ensures that the noise harmonics are fully subtracted.

The considered phase is due to a delay between the input data (ECG with noise) and the output of processor 315 (sine wave of the noise only), that is caused by the FFT calculation. In general, the delay between input to output depends on how many ECG channels the processor uses to calculate the FFT.

This delay is constant and measurable during calibration, and after measuring the delay (depending on how many channels are desired in the system) the circuitry is set with a constant delay value.

Furthermore, as seen in in FIG. 2, in some example embodiments, circuitry 334 includes an antenna 335 configured to detect PLI in the surrounding environment. Output from antenna 335, may provide a general interference reference signal. The reference signal may be used to more accurately detect the frequency of the interference signal, e.g., PLI as well as other interference signals. In such case, frequency measurement module 378 detects frequency of inductive interferences and generates a phase fixed interference in the detected frequency, so that the hybrid PLI filter of FIG. 2 can remove these from the ECG waveform (or from an EGM signal). Inductive and/or capacitive electrical interferences may be generated from components of the pacing, sensing and ablation system 20. The inductive and/or capacitive electrical interferences may be generated by other equipment found in a catheterization room and well as from PLI.

As noted above, in the shown example, any such interference is detected by circuitry 334 comprising antenna 335. As noted above, the frequency measurement module 378 may be fed solely by circuitry 334, or together with the reference signal from the electrical power grid (e.g., by summing the wired and wireless reference signals).

The PLI harmonics estimator (e.g., circuitry comprising artifact detection module 322) is further configured to receive an interference signal acquired using the antenna, and estimate in real-time one or more harmonics of the interference signal, and, responsively to the estimation, output one or more harmonic waveforms matching the respective one or more harmonics of the interference signal. The differential amplifier 316 receives the input analog signal and the one or more harmonic waveforms, and suppresses the superimposed interference signal in the input analog signal using the one or more harmonic waveforms, and output an analog output signal corresponding to the input analog signal (e.g., the filtered ECG 350) having the suppressed interference signal.

Figure 3:
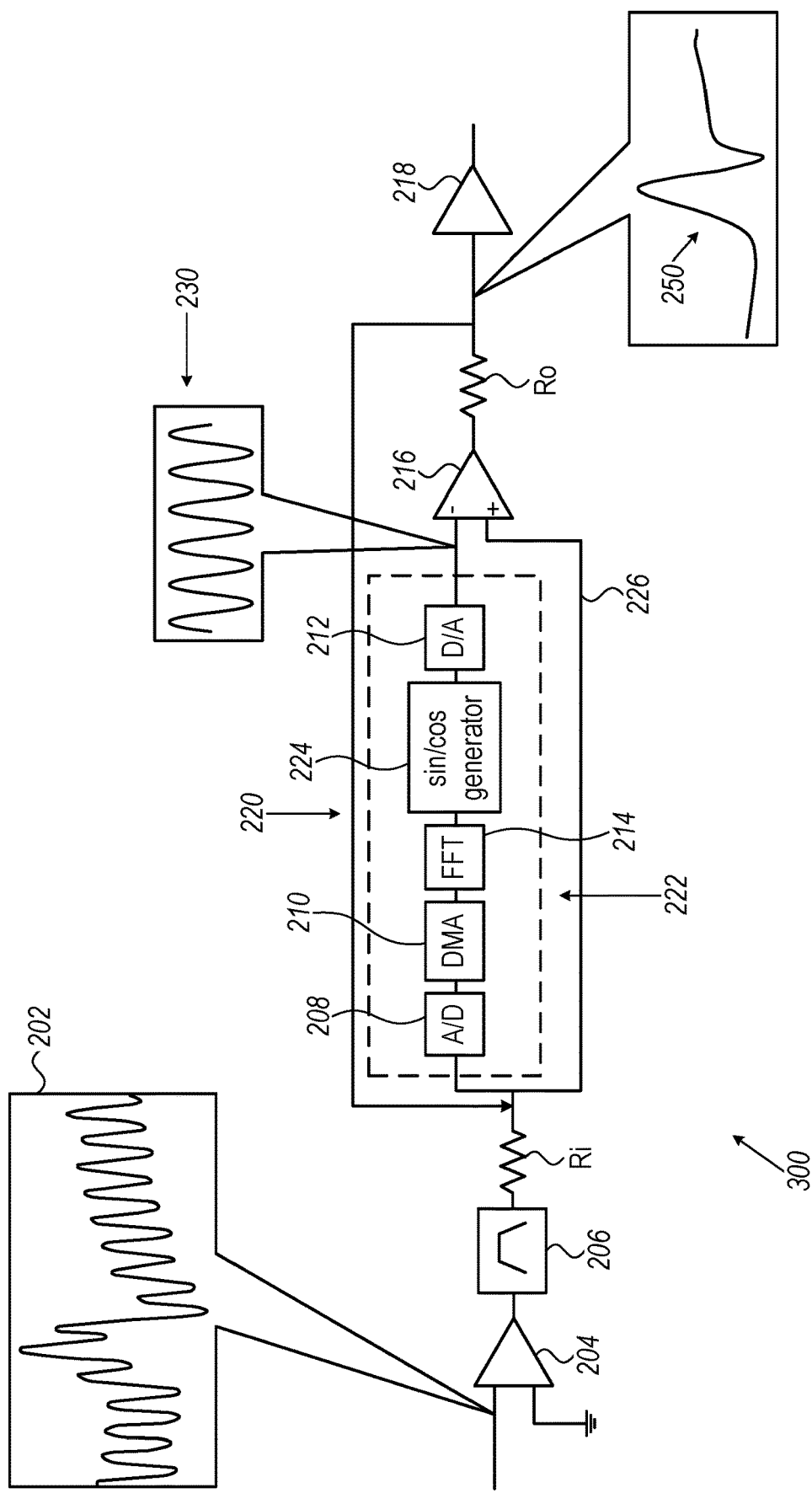
FIG. 3 is a schematic block diagram of a circuitry for PLI removal from an analog ECG signal in real-time, according to another example of the present disclosure.

FIG. 3 is a schematic block diagram of a circuitry 300 for power line interference (PLI) removal from an analog ECG signal 202 in real-time, according to another example of the present disclosure. As seen, the ECG signal is typically superimposed with PLI, e.g., with a 50 Hz or 60 Hz signal. In some example embodiments, circuitry 300 includes amplifier 204, band-pass filter 206, microprocessor 222, a feedback loop 220 and differential amplifier 216. According to some example embodiments, in circuitry 300, microprocessor 222 generates an estimated PLI signal that is inverted (180° phase shift) with respect to ECG 202 and differential amplifier 216 subtracts that signal from ECG 202. In some example embodiments, output from circuitry 300 is then amplified with amplifier 218 and displayed on recorder 35. Optionally and preferably, amplifier 218 is embedded in recorder 35.

According to some example embodiments, microprocessor 222 crudely samples ECG 202 to detect the PLI. In some example embodiments, microprocessor 222 is a 12-bit processor that is optionally and preferably an off-the-shelf product. Other sized microprocessors are also contemplated, e.g., 16-bit microprocessors. In some example embodiments, microprocessor 222 includes a Direct Memory Access (DMA) 210, an FFT module 214 (or FFT capability) and sin/cos generator 224.

According to some example embodiments, an analog to digital converter 208 of microprocessor 222 samples the input ECG signal. Optionally, the input is sampled with 12 bits. In some example embodiments, FFT module 214 performs FFT to detect parameters of the PLI, e.g., the gain, frequency and phase of the PLI sampled. In some example embodiments, sin/cos generator 224 generates a sin/cos signal with the frequency and gain as detected. Optionally, gain and frequency generated may be modulated with respect to the detected gain and frequency based on a pre-defined modulation. According to some example embodiments, a phase of the generated signal is defined to be inverted (180° phase shift) with respect to ECG 202 in line 226, so that addition of this generated PLI signal at differential amplifier 216 will provide subtracting the PLI from ECG 202. Optionally, the phase is based on a detected phase of the sampled signal plus a pre-defined correction to account for a delay imposed by microprocess 222. Optionally, the delay is 20 milliseconds. The generated PLI with the defined phase shift is converted with digital to analog converter 212 back to an analog signal so that it may be subtracted from ECG 202 using difference amplifier 216.

In some example embodiments, the pre-defined correction to account for any delay incurred by computation time may be stored in memory of microprocessor 222.

According to some example embodiments, feedback loop 220 directs the output from circuit 300 back to microprocessor 222 to progressively improve the PLI detection.

Optionally, feedback 220 progressively improves (e. g., within time of up to few cardiac cycles) the phase and frequency matching of circuitry 300. The disclosed circuitry can be seen as gradually adjusting the phase (in a trail an error mode) of the corrective waveform until improved PLI suppression is achieved.

As noted above, in this solution, the first few cardiac cycles may still be noisy but after that the processing circuitry achieves sufficient PLI suppression in real-time. While the real-time PLI subtraction provided by the low cost 12-bit microprocessor 222 is somewhat "crude," the PLI is still reduced from the analog ECG signal to a level that makes further analysis of ECG signal 250 easier (e.g., reduced by at least an order of magnitude). In some example embodiments, reducing the PLI noise improves identification of the T-wave occurrence.

Output from differential amplifier 216 is amplified with amplifier 218 and displayed on recorder 35. In some example embodiments, suppressing the PLI prior to displaying the ECG on the recorder improves the ability to detect the T-wave occurrence times and responsively generate a pacing signal that catheter 21 injects to heart 26.

To provide removing the PLI microprocessor 222, which may be a commercially available microprocessor, includes several sub-circuits:

(a) An A/D 12-bit sampling stage 208, which, while being somewhat crude, provides sufficiently accurate sampling of the ECG signal.

(b) The sampled signal is aggregated in a data points acquirer 210 which may be a direct memory access (DMA) controller 210 type.

(c) Buffer stage 210 enables a 50 Hz (or 60 Hz) signal amplitude detector in the form of an FFT stage 214 to extract the amplitude of the PLI and output the estimated PLI amplitude to a harmonic sin/cosine wave generator 224. The digital harmonic signal defined to have a phase shift to suppress PLI on the analog ECG signal on line 226 directed to differential amplifier 216.

(d) A D/A 12-bit conversion stage 212 that outputs a respective analog 50 Hz signal with the correct amplitude format to difference amplifier 216.

PLI removal circuitries 200 and 300 of FIGS. 2 and 3 are simplified for clarity of presentation. For example, a power supply to circuitries 200 and 300 is omitted from figures.

Method of PLI Removal from an Analog EP Signal in Real Time

Figure 4:
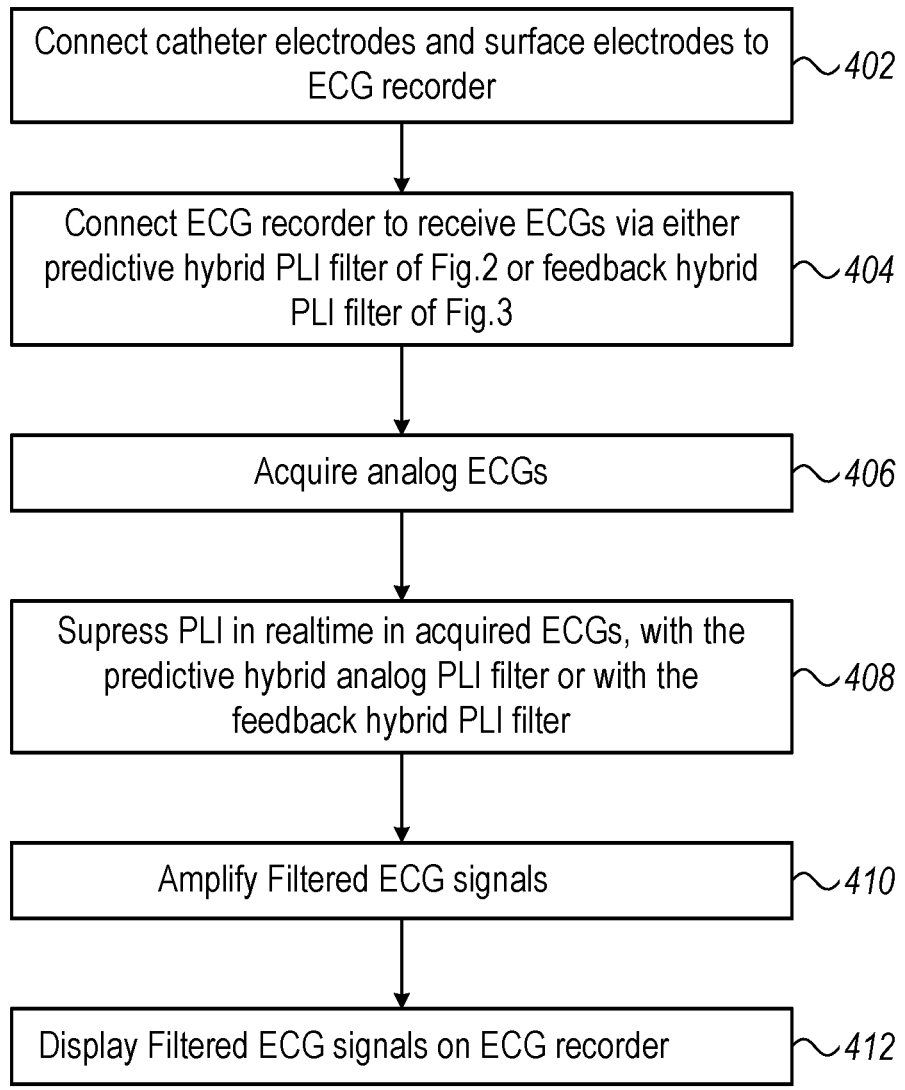
FIG. 4 is a flow chart that schematically illustrates a method for PLI removal from an analog EP signal using one of the circuitries of FIGS. 2 and 3, according to an example of the present disclosure.

FIG. 4 is a flow chart that schematically illustrates a method for PLI removal from an analog EP signal using one of circuitries 200 and 300 of FIGS. 2 and 3, according to an example of the present disclosure. The process begins with connecting the catheter electrodes and the surface electrodes 49 to ECG recorder 35, by connecting proximal end of catheter 21 and cable 39 to recorder 35 (step 402).

One of the predictive hybrid PLI filter of FIG. 2 or the feedback hybrid PLI filter of FIG. 3 is coupled between recorder 35 and at least one of the catheter electrodes and the surface electrodes 49, at a hybrid PLI filtration setup step 404. It is noted that step 404 may typically occur together with before step 402.

At an analog ECG acquisition step 406, the physician acquires analog ECG signal during an EP mapping session, as described in FIG. 1. These analog signals are suspected of including PLI.

At a PLI suppression step 408, either the predictive hybrid PLI filter of FIG. 2 or the feedback hybrid PLI filter of FIG. 3 PLI, as described above is applied to suppress the PLI on the analog ECG signal.

The PLI-removed analog ECG signals are amplified 410 and displayed on the recorder 35 (step 412).

The flow chart of FIG. 4 is simplified for clarity of presentation. For example, additional steps may be performed, such as the physician viewing the PLI-removed EP waveforms on a display.

Although the examples described herein mainly address cardiac EP pacing and mapping, the methods and systems described herein can also be used in other applications, such as in Electromyogram and Electroencephalogram Measurements.

It will thus be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Example 1: A method for suppressing power line interference (PLI) on an electrocardiogram (ECG) line (22, 39), the method comprising: sampling an ECG signal on the ECG line; detecting at least one parameter characterizing PLI on the ECG line; generating an analog PLI cancellation signal based on said detecting; defining phase of said PLI cancellation signal; converting said PLI cancellation signal with said phase to an analog PLI cancellation signal (230, 333); amplifying a difference between said analog PLI cancellation signal and said ECG signal (226, 303) to generate an ECG signal (250) with suppressed PLI; and directing said ECG signal with suppressed PLI to an ECG recorder.

Example 2: The method of example 1, wherein said phase is defined to compensate for an expected phase shift between said PLI cancellation signal and PLI on said concurrent ECG signal on the ECG line due to a time delay imposed by said microprocessor.

Example 3: The method of example 2, wherein said time delay is predicted.

Example 4: The method of to any one of examples 1-3, further comprising feeding the ECG signal with suppressed PLI back to the ECG line in a feedback loop (220).

Example 5: The method of any one of example 1 and example 2, wherein said time delay is computed based on calibration.

Example 6: The method of any one of examples 1-5, wherein said sampling, said detecting, said generating and said converting is executed by a microprocessor (222).

Example 7: The method of example 6, wherein said microprocessor (222) is a 12-bit microprocessor including direct memory access (DMA) (210).

Example 8: The method of any one of examples 1-7, wherein said at least one parameter is selected from a group including gain, frequency and phase and wherein said detecting at least one parameter is based on a Fast Fourier Transformation (FFT).

Example 9: The method of any one of examples 1-8, comprising receiving an interference reference signal from which a fundamental frequency of said PLI and at least one harmonic of PLI on the ECG line is determined.

Example 10: The method of example 9, wherein said interference reference signal is received from an antenna (335) positioned in the vicinity of the ECG line.

Example 11: A device for suppressing power line interference (PLI) on an electrocardiogram (ECG) line comprising: a microprocessor (222) configured to: sample an ECG signal (202) on the ECG line (22, 39); detect at least one parameter characterizing PLI on the ECG line; generate an analog PLI cancellation signal based on said detecting; define phase of said PLI cancellation signal; and convert said PLI cancellation signal with said phase to an analog PLI cancellation signal (230); and a differential amplifier (216) configured to amplify a difference between said PLI cancellation signal outputted from said microprocessor and said ECG signal to generate at an output of said differential amplifier an ECG signal (250) with suppressed PLI.

Example 12: The device of example 11, wherein said phase is defined to compensate for an expected phase shift between said PLI cancellation signal and PLI on said concurrent ECG signal on the ECG line due to a time delay imposed by said microprocessor (222).

Example 13: The device of example 12, further comprising a feedback loop (220) configured to feed said ECG signal (250) with suppressed PLI back to the ECG line.

Example 14: The device of any one of examples 11-13, wherein said microprocessor (222) is a 12-bit microprocessor including direct memory access (DMA) (210).

Example 15: The device of any one of examples 11-14, wherein said microprocessor (222) is configured to perform FFT to detect said at least one parameter.

Example 16: The device of example 15, wherein said at least one parameter includes gain, frequency, and phase of sampled ECG signal.

Example 17: The device of any one of examples 11-16, further comprising: an antenna configured to receive PLI in the vicinity of the ECG line; and PLI harmonics estimator configured to estimate a fundamental frequency and at least one harmonic of said PLI on the ECG line based on output from said antenna.

Example 18: A power line interference (PLI) suppression system, comprising: a predictive PLI harmonics estimator (308, 315 and 332), which is configured to: receive an input analog electrocardiogram (ECG) signal (303) superimposed with PLI and estimate one or more harmonics of the PLI in real-time; and responsively to the one or more estimated harmonics, output one or more harmonic waveforms matching the respective one or more harmonics of the PLI (350); and a PLI canceler (200), which is configured to: receive the input analog ECG signal and the one or more harmonic waveforms; suppress the superimposed PLI in the input analog ECG signal using the one or more harmonic waveforms; and output an analog ECG output signal (350) corresponding to the input analog ECG signal having the suppressed PLI.

Example 19: The system according to example 18, wherein the predictive PLI harmonics estimator (308, 315 and 332) is configured to estimate the one or more harmonics of a given cycle of the PLI based on at least one previous cycle of the PLI.

Example 20: A power line interference (PLI) suppression system, comprising: a PLI harmonics estimator (308, 315 and 332), which is configured to: receive an input analog ECG signal (303) superimposed with PLI and estimate one or more harmonics of the PLI in real-time; and responsively to the one or more estimated harmonics, output one or more harmonic waveforms matching the respective one or more harmonics of the PLI; and a PLI canceler (200), having a feedback loop and configured to: receive the input analog signal and the one or more harmonic waveforms; using the feedback loop, suppress the superimposed PLI in the input analog signal using the one or more harmonic waveforms; and output an analog output signal corresponding to the input analog signal having the suppressed PLI.

The invention claimed is:

1. A method for suppressing power line interference (PLI) on an electrocardiogram (ECG) line, the method comprising:
   sampling an ECG signal on the ECG line;
   detecting at least one parameter characterizing PLI on the ECG line;
   generating an analog PLI cancellation signal based on said detecting;
   defining phase of said PLI cancellation signal;
   converting said PLI cancellation signal with said phase to an analog PLI cancellation signal;
   amplifying a difference between said analog PLI cancellation signal and said ECG signal to generate an ECG signal with suppressed PLI;
   feeding the ECG signal with suppressed PLI back to the ECG line in a feedback loop; and
   directing said ECG signal with suppressed PLI to an ECG recorder.

2. The method of claim 1, wherein said phase is defined to compensate for an expected phase shift between said PLI cancellation signal and PLI on said ECG signal on the ECG line due to a time delay imposed by a microprocessor.

3. The method of claim 2, wherein said time delay is predicted.

4. The method of claim 2, wherein said time delay is computed based on calibration.

5. The method of claim 1, wherein said sampling, said detecting, said generating and said converting is executed by a microprocessor.

6. The method of claim 5, wherein said microprocessor is a 12-bit microprocessor including direct memory access (DMA).

7. The method of claim 1, wherein said at least one parameter is selected from a group including gain, frequency and phase and wherein said detecting at least one parameter is based on a Fast Fourier Transformation (FFT).

8. The method of claim 1, comprising receiving an interference reference signal from which a fundamental frequency of said PLI and at least one harmonic of PLI on the ECG line is determined.

9. The method of claim 8, wherein said interference reference signal is received from an antenna positioned in the vicinity of the ECG line.

10. A device for suppressing power line interference (PLI) on an electrocardiogram (ECG) line comprising: a 12-bit microprocessor including direct memory access (DMA), said microprocessor configured to: sample an ECG signal on the ECG line; detect at least one parameter characterizing PLI on the ECG line; generate an analog PLI cancellation signal based on said detecting; define phase of said PLI cancellation signal; and convert said PLI cancellation signal with said phase to an analog PLI cancellation signal; and a differential amplifier configured to amplify a difference between said PLI cancellation signal outputted from said microprocessor and said ECG signal to generate at an output of said differential amplifier an ECG signal with suppressed PLI.

11. The device of claim 10, wherein said phase is defined to compensate for an expected phase shift between said PLI cancellation signal and PLI on said concurrent ECG signal on the ECG line due to a time delay imposed by said microprocessor.

12. The device of claim 11, further comprising a feedback loop configured to feed said ECG signal with suppressed PLI back to the ECG line.

13. The device of claim 10, wherein said microprocessor is configured to perform Fast Fourier Transform (FFT) to detect said at least one parameter.

14. The device of claim 13, wherein said at least one parameter includes gain, frequency, and phase of sampled ECG signal.

15. A method for suppressing power line interference (PLI) on an electrocardiogram (ECG) line, the method comprising:
sampling an ECG signal on the ECG line;
detecting at least one parameter characterizing PLI on the ECG line;
generating an analog PLI cancellation signal based on said detecting;
defining phase of said PLI cancellation signal, wherein said phase is defined to compensate for an expected phase shift between said PLI cancellation signal and PLI on said ECG signal on the ECG line due to a time delay imposed by a microprocessor, wherein said time delay is computed based on calibration;
converting said PLI cancellation signal with said phase to an analog PLI cancellation signal;
amplifying a difference between said analog PLI cancellation signal and said ECG signal to generate an ECG signal with suppressed PLI; and
directing said ECG signal with suppressed PLI to an ECG recorder.

16. The method of claim 15, wherein said phase is defined to compensate for an expected phase shift between said PLI cancellation signal and PLI on said ECG signal on the ECG line due to a time delay imposed by the microprocessor.

17. The method of claim 16, wherein said microprocessor is a 12-bit microprocessor including direct memory access (DMA).

18. A device for suppressing power line interference (PLI) on an electrocardiogram (ECG) line comprising:
a microprocessor configured to:
sample an ECG signal on the ECG line;
detect at least one parameter characterizing PLI on the ECG line;
generate an analog PLI cancellation signal based on said detecting;
define phase of said PLI cancellation signal, wherein said phase is defined to compensate for an expected phase shift between said PLI cancellation signal and PLI on said concurrent ECG signal on the ECG line due to a time delay imposed by said microprocessor; and
convert said PLI cancellation signal with said phase to an analog PLI cancellation signal;
a differential amplifier configured to amplify a difference between said PLI cancellation signal outputted from said microprocessor and said ECG signal to generate at an output of said differential amplifier an ECG signal with suppressed PLI; and
a feedback loop configured to feed said ECG signal with suppressed PLI back to the ECG line.

19. The device of claim 18 wherein said microprocessor is configured to perform Fast Fourier Transform (FFT) to detect said at least one of gain, frequency, and phase of sampled ECG signal.

* * * * *